(12) United States Patent
Jeganathan et al.

(10) Patent No.: US 10,809,782 B2
(45) Date of Patent: Oct. 20, 2020

(54) ADAPTIVE GRAPHICS SUBSYSTEM POWER AND PERFORMANCE MANAGEMENT

(71) Applicant: Intel Corporation, Santa Clara, CA (US)

(72) Inventors: Nithyananda Siva Jeganathan, Portland, OR (US); Rajesh Poornachandran, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 43 days.

(21) Appl. No.: 15/894,311

(22) Filed: Feb. 12, 2018

(65) Prior Publication Data

US 2018/0239405 A1   Aug. 23, 2018

Related U.S. Application Data

(63) Continuation of application No. 14/757,901, filed on Dec. 23, 2015, now Pat. No. 9,891,681, which is a
(Continued)

(51) Int. Cl.
*G06F 1/00* (2006.01)
*G06F 1/26* (2006.01)
(Continued)

(52) U.S. Cl.
CPC .............. *G06F 1/26* (2013.01); *G06F 1/3218* (2013.01); *G06F 1/3234* (2013.01);
(Continued)

(58) Field of Classification Search
CPC . G06F 1/26; G06F 3/14; G06F 1/3218; G06F 1/3265; G06F 1/3234; G06T 1/20;
(Continued)

(56) References Cited

U.S. PATENT DOCUMENTS 5,894,580 A     4/1999  Yoshida
6,834,354 B1   12/2004  Togawa
(Continued)

FOREIGN PATENT DOCUMENTS

CN           1602460         3/2005
CN         101598969        12/2009
(Continued)

OTHER PUBLICATIONS

Notice of Allowance for CN Application No. 201610084188.1, dated Aug. 3, 2018, 6 pages.
(Continued)

*Primary Examiner* — Xuxing Chen
(74) *Attorney, Agent, or Firm* — Jaffery Watson Mendonsa & Hamilton LLP

(57) ABSTRACT

Examples are disclosed for adaptive graphics subsystem power and performance management including adjusting one or more power management or performance attributes for a graphics subsystem for a computing platform based on a comparison of a current quality metric to a target quality metric. The current and target quality metric to be separately determined based on current and target quality of service (QoS) values for power management and performance for at least portions of the computing platform.

20 Claims, 10 Drawing Sheets

Related U.S. Application Data continuation of application No. 13/976,467, filed as application No. PCT/US2011/064165 on Dec. 9, 2011, now Pat. No. 9,250,688.

(51) Int. Cl.

| | | |
|---|---|---|
| *G06F 1/3218* | (2019.01) | |
| *G06F 1/3234* | (2019.01) | |
| *G06F 3/14* | (2006.01) | |
| *G06T 1/20* | (2006.01) | |
| *H04W 28/24* | (2009.01) | |
| *H04W 52/26* | (2009.01) | |
| *H04W 52/24* | (2009.01) | |

(52) U.S. Cl.
CPC .............. *G06F 1/3265* (2013.01); *G06F 3/14* (2013.01); *G06T 1/20* (2013.01); *G09G 2330/021* (2013.01); *G09G 2330/022* (2013.01); *G09G 2340/0407* (2013.01); *H04W 28/24* (2013.01); *H04W 52/241* (2013.01); *H04W 52/26* (2013.01); *H04W 52/265* (2013.01); *Y02D 10/153* (2018.01)

(58) Field of Classification Search
CPC .... Y02D 10/153; H04W 28/24; H04W 52/26; H04W 52/265; H04W 52/241; G09G 2330/021; G09G 2330/022; G09G 2340/0407

See application file for complete search history.

(56) References Cited

U.S. PATENT DOCUMENTS

| | | |
|---|---|---|
| 7,787,406 B2 | 8/2010 | Park et al. |
| 2005/0227763 A1 | 10/2005 | Lum et al. |
| 2006/0030272 A1 | 2/2006 | Nakamizo et al. |
| 2006/0211441 A1 | 9/2006 | Mese et al. |
| 2008/0057894 A1 | 3/2008 | Aleksic et al. |
| 2008/0261663 A1 | 10/2008 | Park et al. |
| 2009/0067372 A1 | 3/2009 | Shah et al. |
| 2009/0249103 A1 | 10/2009 | Jeyaseelan et al. |
| 2010/0077243 A1 | 3/2010 | Wang et al. |
| 2011/0268000 A1 | 11/2011 | Kashikar et al. |
| 2012/0159060 A1 | 6/2012 | Yu et al. |

FOREIGN PATENT DOCUMENTS

| | | |
|---|---|---|
| CN | 100592310 C | 2/2010 |
| CN | 102213996 | 10/2011 |
| CN | ZL201180075356.6 | 4/2017 |
| EP | 1 115 051 A1 | 7/2001 |
| EP | 3299929 | 3/2018 |
| TW | 200931893 | 7/2009 |
| TW | 201003377 | 1/2010 |
| WO | 2013085539 | 6/2013 |

OTHER PUBLICATIONS

1st Office Action for CN Application No. 201610084188.1, dated Nov. 27, 2017, 29 pages.
International Preliminary Report on Patentability for Application No. PCT/US2011/064165, dated Jun. 19, 2014, 6 pages.
Application No. 11876945A-1879/2788834, Summons to attend oral proceedings, Feb. 22, 2017, 11 pages.
Notice of Allowance for TW Application No. 104135855, dated Jan. 6, 2017, 2 pages.
Office Action for TW Application No. 104135855, 5 pages, dated Sep. 26, 2016.
Notice of Allowance for CN Application No. 201180075356.6, dated Jan. 20, 2017, 6 pages.
PCT International Search Report and Written Opinion of the International Searching Authority for International Application No. PCT/US2011/064165, dated Dec. 9, 2011, 9 pages.
Extended European Search Report received for European Patent Application No. 11876945.4, dated Jun. 18, 2015, 9 pages.
Communication Pursuant to Article 94(3) EPC (Examination Report) for European Application No. 11 876 945.4-1959, dated Jul. 6, 2016, 9 pages.
Chinese Application No. 201180075356.6 The State Intellectual Property Office of the People's Republic of China, Notice on the First Office Action, dated Sep. 21, 2015, 7 pages.
Chinese Application No. 201180075356.6 The State Intellectual Property Office of the People's Republic of China, Notice on the Second Office Action, dated May 18, 2016, 7 pages.

Table 400

Current Power Management QoS Values

| Attribute | Power vs. Performance Rating | | | Ave. |
|---|---|---|---|---|
| | High | Medium | Low | |
| Display: | | | | |
| Resolution | | 2 | | |
| Brightness | 3 | | | |
| Refresh Rate | | 2 | | |
| Depth | 3 | | | |
| | | | | 2.5 |
| Graphics & Video: | | | | |
| Texture | | 2 | | |
| Render Target | | 2 | | |
| Overlay Type | | | 1 | |
| Frequency | | 2 | | |
| Copy Rate | | 2 | | |
| mipmap | | 2 | | |
| Compression Ratio | 3 | | | |
| | | | | 2 |
| System Power Management: | | | | |
| System State | | 2 | | |
| Battery Power | | | 1 | |
| | | | | 1.5 |

FIG. 4

Table 500
Current Performance QoS Values

| Attribute | Performance vs. Power Rating | | | Ave. |
|---|---|---|---|---|
| | High | Medium | Low | |
| Display: | | | | |
| Resolution | | 2 | | |
| Brightness | | 2 | | |
| Refresh Rate | | 2 | | |
| Depth | | 2 | | |
| | | | | 2 |
| Graphics & Video: | | | | |
| Texture | 3 | | | |
| Render Target | 3 | | | |
| Overlay Type | 3 | | | |
| Frequency | 3 | | | |
| Copy Rate | 3 | | | |
| mipmap | 3 | | | |
| Compression Ratio | 3 | | | |
| | | | | 3 |
| Application: | | | | |
| Max. Latency | | 2 | | |
| | | | | 2 |
| User Experience: | | | | |
| Max. Response | 3 | | | |
| | | | | 3 |
| System Performance: | | | | |
| System State | 3 | | | |
| | | | | 3 |

FIG. 5

Table 600
Target Power Management QoS Values

| Attribute | Power vs. Performance Rating | | | Ave. |
|---|---|---|---|---|
| | High | Medium | Low | |
| Display: | | | | |
| Resolution | | | 1 | |
| Brightness | | | 1 | |
| Refresh Rate | | | 1 | |
| Depth | | | 1 | |
| | | | | 1 |
| Graphics & Video: | | | | |
| Texture | | | 1 | |
| Render Target | | | 1 | |
| Overlay Type | | | 1 | |
| Frequency | | | 1 | |
| Copy Rate | | | 1 | |
| mipmap | | | 1 | |
| Compression Ratio | | | 1 | |
| | | | | 1 |
| System Power Management: | | | | |
| System State | | | 1 | |
| Battery Power | | | 1 | |
| | | | | 1 |

FIG. 6

Table 700
Target Performance QoS Values

| Attribute | Performance vs. Power Rating | | | Ave. |
|---|---|---|---|---|
| | High | Medium | Low | |
| Display: | | | | |
| Resolution | 3 | | | |
| Brightness | 3 | | | |
| Refresh Rate | 3 | | | |
| Depth | 3 | | | |
| | | | | 3 |
| Graphics & Video: | | | | |
| Texture | 3 | | | |
| Render Target | 3 | | | |
| Overlay Type | 3 | | | |
| Frequency | 3 | | | |
| Copy Rate | 3 | | | |
| mipmap | 3 | | | |
| Compression Ratio | 3 | | | |
| | | | | 3 |
| Application: | | | | |
| Max. Latency | 3 | | | |
| | | | | 3 |
| User Experience: | | | | |
| Max. Response | 3 | | | |
| | | | | 3 |
| System Performance: | | | | |
| System State | 3 | | | |
| | | | | 3 |

FIG. 7

ADAPTIVE GRAPHICS SUBSYSTEM POWER AND PERFORMANCE MANAGEMENT

The present patent application is continuation application claiming priority from and to application Ser. No. 14/757,901, filed Dec. 23, 2015, pending, which is a continuation application claiming priority from and to U.S. Pat. No. 9,250,688, issued Feb. 2, 2016, which is a U.S. National Phase Application under 35 U.S.C. 371 of International Application No. PCT/US2011/064165 filed Dec. 9, 2011, the contents of which are incorporated herein in their entirety by reference.

BACKGROUND

Graphics subsystems that perform processing of images for computing platforms may consume large amounts of power. Mobile computing platforms operating under limited amounts of available power (e.g., battery power) typically deploy statically defined power management techniques for these graphics subsystems. The statically defined power management techniques may be an attempt to balance power saving with computing platform performance.

BRIEF DESCRIPTION OF THE DRAWINGS

FIG. 4 illustrates an example table for current power management QoS values.
FIG. 5 illustrates an example table for current performance QoS values.
FIG. 6 illustrates an example table for target power management QoS values.
FIG. 7 illustrates an example table for target performance QoS values.

DETAILED DESCRIPTION

As contemplated in the present disclosure, statically defined power management techniques may be an attempt to balance power saving with computing platform performance. In some examples, these statically defined power management techniques may not be sensitive to application states or modes of operation. Also, statically defined power management techniques may lack an ability to adapt to quality of service (QoS) constraints (e.g., from an application and/or user) to extend battery life yet maintain acceptable performance.

Current statically defined power management techniques may transition one or more graphics subsystems to lower power states if the one or more graphics subsystems are idle for a fixed period of time. The transition to the lower power states may occur without considering the platform's current mode of operation, application workload/requirements, user QoS requirements, etc. The fixed period of time without knowledge of the next wakeup from active to a lower power state may lead to frequent transitions between low power states (e.g., sleep states) to higher power states (e.g., active states). The frequent transitions may lead to dips in performance due to associated context save-and-restores and power loss due to transitional overhead. Also, statically defined power management techniques are likely not flexible enough to adapt to aggressive, device specific power and performance management, and user/application QoS constraints.

In some examples, techniques are implemented for adaptive graphics subsystem power and performance management. For these examples, a current power management quality of service (QoS) value and a current performance QoS value may be received. The current power management and performance QoS values may be associated with a first mode of operation. A current quality metric may then be determined based, at least in part, on the current power management and performance QoS values. A target power management QoS value and a target performance QoS value may also be received. The target power management and performance QoS values may be associated with a second mode of operation. A target quality metric may also be determined based, at least in part, on the target power management and performance QoS values. One or more power management or performance attributes for one or more graphics subsystems of a computing platform may be adjusted based, at least in part, on a comparison of the current quality metric to the target quality metric. For example, an idle time-out window may be adjusted. The idle time-out window, for example may include a time interval for which the one or more graphics subsystems remain in an active state following execution of a command before transitioning into a low power state.

Figure 1:
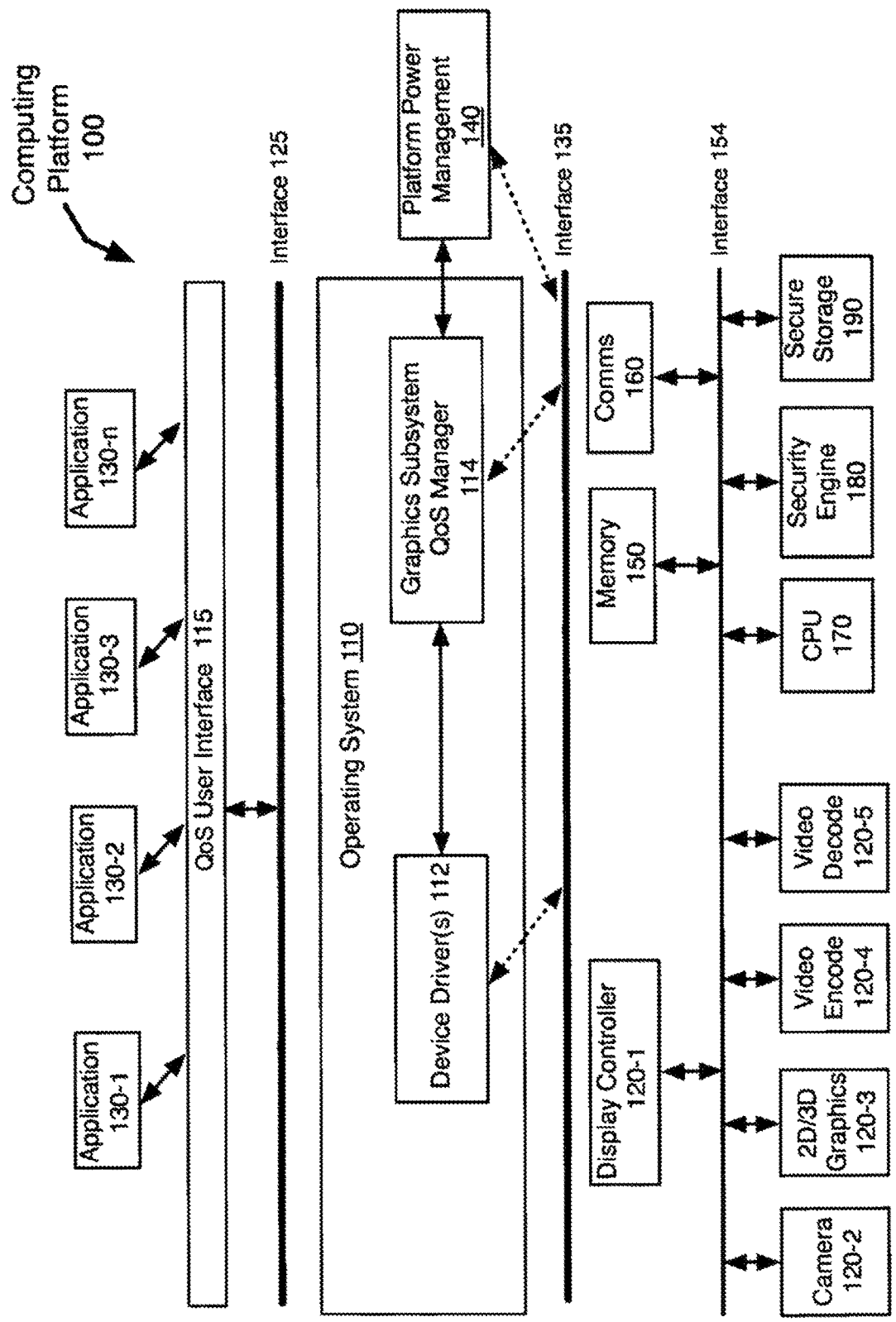
FIG. 1 illustrates an example computing platform.

FIG. 1 illustrates an example computing platform 100. As shown in FIG. 1, computing platform 100 includes an operating system 110, applications 130-1 to 130-*n*, a platform power management 140, a memory 150, communications (comms) 160, a central processing unit (CPU) 170, a security engine 180 and secure storage 190. Also, as shown in FIG. 1, computing platform 100 includes a display controller 120-1, a camera 120-2, 2-dimensional/3-dimensional (2D/3D) graphics 120-3, a video encode 120-4 and a video decode 120-5. In some examples, display controller 120-1, camera 120-2, 2D/3D graphics 120-3, video encode 120-4 and video decode 120-5 may be either separately or jointly identified as a graphics subsystem for computing platform 100. Although this disclosure not limited to graphics subsystems including the five graphics subsystems shown in FIG. 1.

According to some examples, several interfaces are also depicted in FIG. 1 for interconnecting and/or communicatively coupling elements of computing platform 100. For example, QoS user interface 115 and interface 125 may allow for users (not shown) and/or applications 130-1 to 130-*n* to couple to operating system 110. Also, interface 135 may allow for platform power management 140 or elements of operating system 110 to communicatively couple to elements of computing platform 100 such as CPU 170, memory 150 or one or more of the graphic subsystems mentioned above. Interface 154, for example, may allow hardware and/or firmware elements of computing platform 100 to communicatively couple together, e.g., via a system bus or other type of internal communication channel.

In some examples, as shown in FIG. 1, operating system 110 may include device driver(s) 112 and graphics subsystem QoS manager 114. Device driver(s) 112 and graphics subsystem QoS manager 114 may include logic and/or features configured to interact with other elements of computing platform 100 (e.g., via interface 135). Also, as shown in FIG. 1, graphics subsystem QoS manager 114 may also interact with device driver(s) 112 or platform power management 140.

According to some examples, device driver(s) 112 may include one or more graphics subsystem drivers to interact with display controller 120-1, camera 120-2, 2D/3D graphics 120-3, video encode 120-4 or video decode 120-5. For these examples, device driver(s) 112 may provide current performance QoS values associated with one or more of these graphics subsystems to graphics subsystem QoS manager 114. As described more below, the current performance QoS values may be compared to target performance QoS values and then may be used to adjust one or more power management or performance attributes for the one or more graphics subsystems.

In some examples, platform power management 140 may include logic and/or features to gather system power information for computing platform 100. For example, platform power management 140 may gather system state information for computing platform 100 such as whether CPU 170 is an active or sleep power state or whether a battery (not shown) has adequate power. Platform power management 140, for example, may provide current power management values associated with this gathered system state information to graphics subsystem QoS manager 114. As described more below, a current quality metric (QM) determined from the current power management QoS values may be compared to a target QM determined from the target power management QoS values. One or more power management or performance attributes for the one or more graphics subsystems may then be adjusted based on the comparison.

Although not shown in FIG. 1, in some examples, graphics subsystem QoS manager 114 may be included with the logic and/or features of device driver(s) 112. For these examples, the graphics subsystem QoS manager 114 within device driver(s) 112 may interact with platform power management 140 to obtain current power management QoS values. Also, graphics subsystem QoS manager 114 may cooperate with device driver(s) 112 to obtain current performance QoS values from the one or more graphics subsystems of computing platform 100.

According to some examples, as shown in FIG. 1, platform power management 140 may be implemented as logic and/or features configured to either independently manage power or cooperate with operating system 110 to manage power for computing platform 100. In other examples, although not shown in FIG. 1, platform power management 160 may be included as a software module operating within operating system 110.

According to some examples, memory 150 may be implemented as a volatile memory device utilized by various elements of computing platform 100 (e.g., as off-chip memory). For these implementations, memory 130 may include, but is not limited to, random access memory (RAM), dynamic random access memory (DRAM) or static RAM (SRAM).

In some examples, comms 160 may include logic and/or features to enable computing platform 100 to communicate externally with elements remote to computing platform 100. These logic and/or features may include communicating over wired and/or wireless communication channels via one or more wired or wireless networks. In communicating across such networks, comms 160 may operate in accordance with one or more applicable communication or networking standards in any version.

According to some examples, CPU 170 may be implemented as a central processing unit for computing platform 100. CPU 170 may include one or more processing units having one or more processor cores or having any number of processors having any number of processor cores. CPU 170 may include any type of processing unit, such as, for example, a multi-processing unit, a reduced instruction set computer (RISC), a processor having a pipeline, a complex instruction set computer (CISC), digital signal processor (DSP), and so forth.

In some examples, security engine 180 may enable or facilitate secure operations on computing platform 100. In some examples, security engine 180 may manage or control access to secure storage 190. Secure storage 190, for example, may include encrypted information that may only be decrypted by logic and/or features of security engine 180.

As mentioned above, interface 154, may allow hardware and/or firmware elements of computing platform 100 to communicatively couple together. According to some examples, communication channels interface 154 may operate in accordance with one or more protocols or standards. These protocols or standards may be described in one or one or more industry standards (including progenies and variants) such as those associated with the Inter-Integrated Circuit ($I^2C$) specification, the System Management Bus (SMBus) specification, the Accelerated Graphics Port (AGP) specification, the Peripheral Component Interconnect Express (PCI Express) specification, the Universal Serial Bus (USB), specification or the Serial Advanced Technology Attachment (SATA) specification. Although this disclosure is not limited to only the above-mentioned standards and associated protocols.

Figure 2:
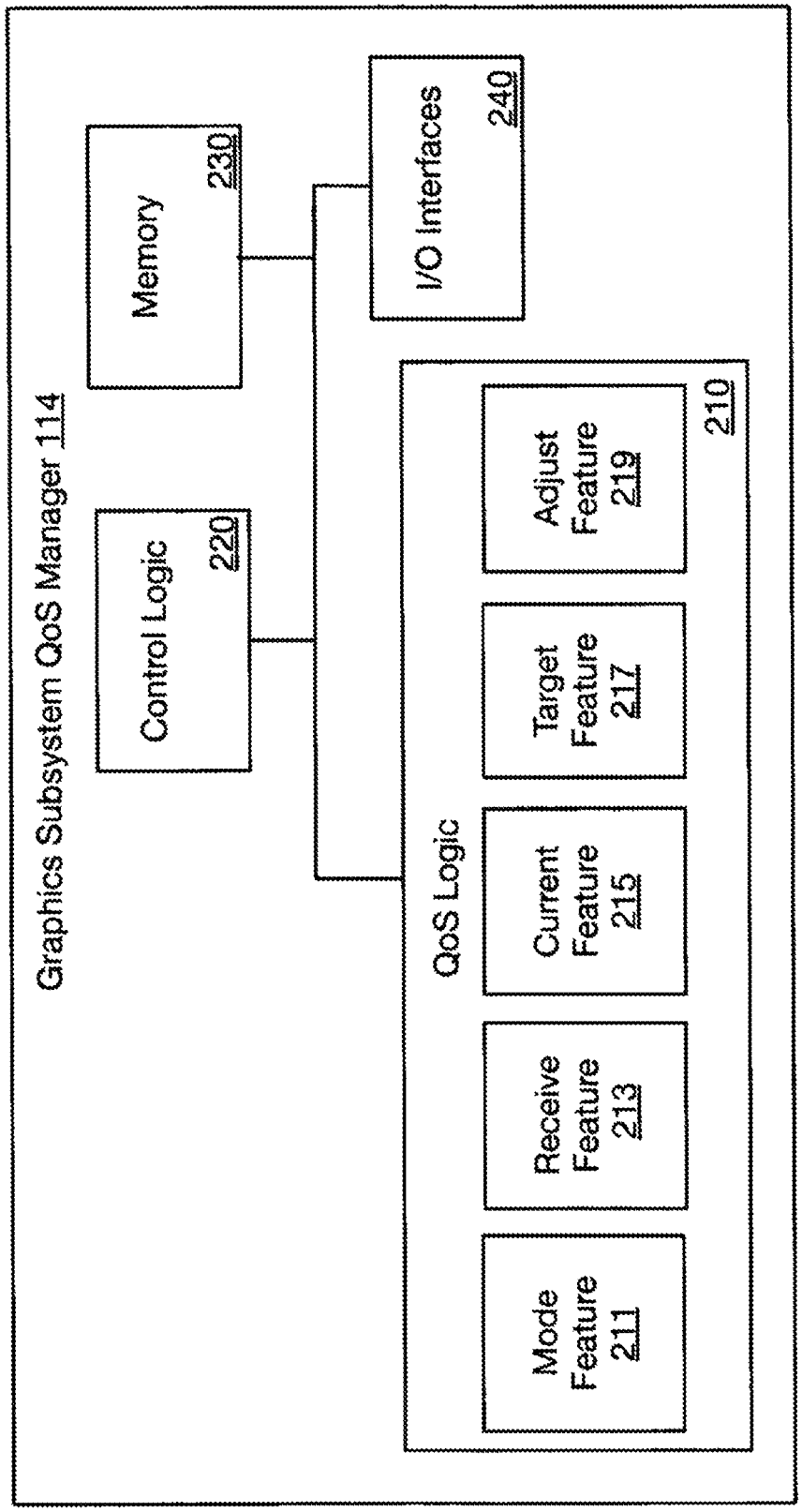
FIG. 2 illustrates a block diagram of an example architecture for a graphics subsystem QoS manager.

In some examples, computing platform 100 may be at least part of a mobile computing device. Examples of a mobile computing device may include a personal computer (PC), laptop computer, ultra-mobile computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth FIG. 2 illustrates a block diagram of an example architecture for graphics subsystem QoS manager 114. As described above for computing platform 100 in FIG. 1, operating system 110 may include graphics subsystem QoS manager 114. In some examples, graphics subsystem QoS manager 114 includes features and/or logic configured or arranged to provide adaptive graphics subsystem power and performance management.

The example graphics subsystem QoS manager 114 of FIG. 2, includes QoS logic 210, control logic 220, a memory 230 and input/output (110) interfaces 240. As illustrated in FIG. 2, QoS logic 210 may be coupled to control logic 220, memory 230 and I/O interfaces 240. QoS logic 210 may include one or more of a mode feature 211, a receive feature 213, a current feature 215, a target feature 217, or an adjust feature 219, or any reasonable combination thereof.

In some examples, the elements portrayed in FIG. 2 are configured to support or enable graphics subsystem QoS manager 114 as described in this disclosure. A given graphics subsystem QoS manager 114 may include some, all or more elements than those depicted in FIG. 2. For example, QoS logic 210 and control logic 220 may separately or collectively represent a wide variety of logic device(s) or executable content to implement the features of graphics subsystem QoS manager 114. Example logic devices may include one or more of a microprocessor, a microcontroller, a process circuit, a field programmable gate array (FPGA), an application specific integrated circuit (ASIC), a sequestered thread or a core of a multi-core/multi-threaded microprocessor or a combination thereof.

In some examples, as shown in FIG. 2, QoS logic 210 includes mode feature 211, receive feature 213, current feature 215, target feature 217, or adjust feature 219. QoS logic 210 may be configured to use one or more of these features to perform operations. For example, mode feature 211 may determine whether a change in mode has occurred, e.g., responsive to a change in type of usage for one or more graphic subsystems of computing platform 100. Receive feature 213 may then receive current and target power management and performance QoS values associated with different modes of operation. Current feature 215, as described more below, may determine a current quality metric (QM) based on the received current power management and performance QoS values. Target feature 217, also as described more below, may determine a target QM based on the received target power management and performance QoS values. Adjust feature 219 may then adjust one or more power management or performance attributes for the one or graphic subsystems based on a comparison of the current QM to the target QM.

In some examples, control logic 220 may be configured to control the overall operation of graphics subsystem QoS manager 114. As mentioned above, control logic 220 may represent any of a wide variety of logic device(s) or executable content. For some examples, control logic 220 may be configured to operate in conjunction with executable content or instructions to implement the control of graphics subsystem QoS manager 114. In some alternate examples, the features and functionality of control logic 220 may be implemented within QoS logic 210.

According to some examples, memory 230 may be arranged to store executable content or instructions for use by control logic 220 and/or QoS logic 210. The executable content or instructions may be used to implement or activate features or elements of graphics subsystem QoS manager 114. As described more below, memory 230 may also be arranged to at least temporarily maintain information associated with determining current and target QMs and adjusting one or more power management or performance attributes for one or more graphics subsystems based on a comparison of the current QM to the target QM.

Memory 230 may include a wide variety of memory media including, but not limited to, one or more of volatile memory, non-volatile memory, flash memory, programmable variables or states, RAM, ROM, or other static or dynamic storage media.

In some examples, I/O interfaces 240 may provide an interface via a local communication medium or link between graphics subsystem QoS manager 114 and elements of computing platform 100 depicted in FIG. 1. I/O interfaces 240 may include interfaces that operate according to various communication protocols to communicate over the local communication medium or link (e.g., I²C, SMBus, AGP, PCI Express, USB, SATA, etc).

Figure 3:
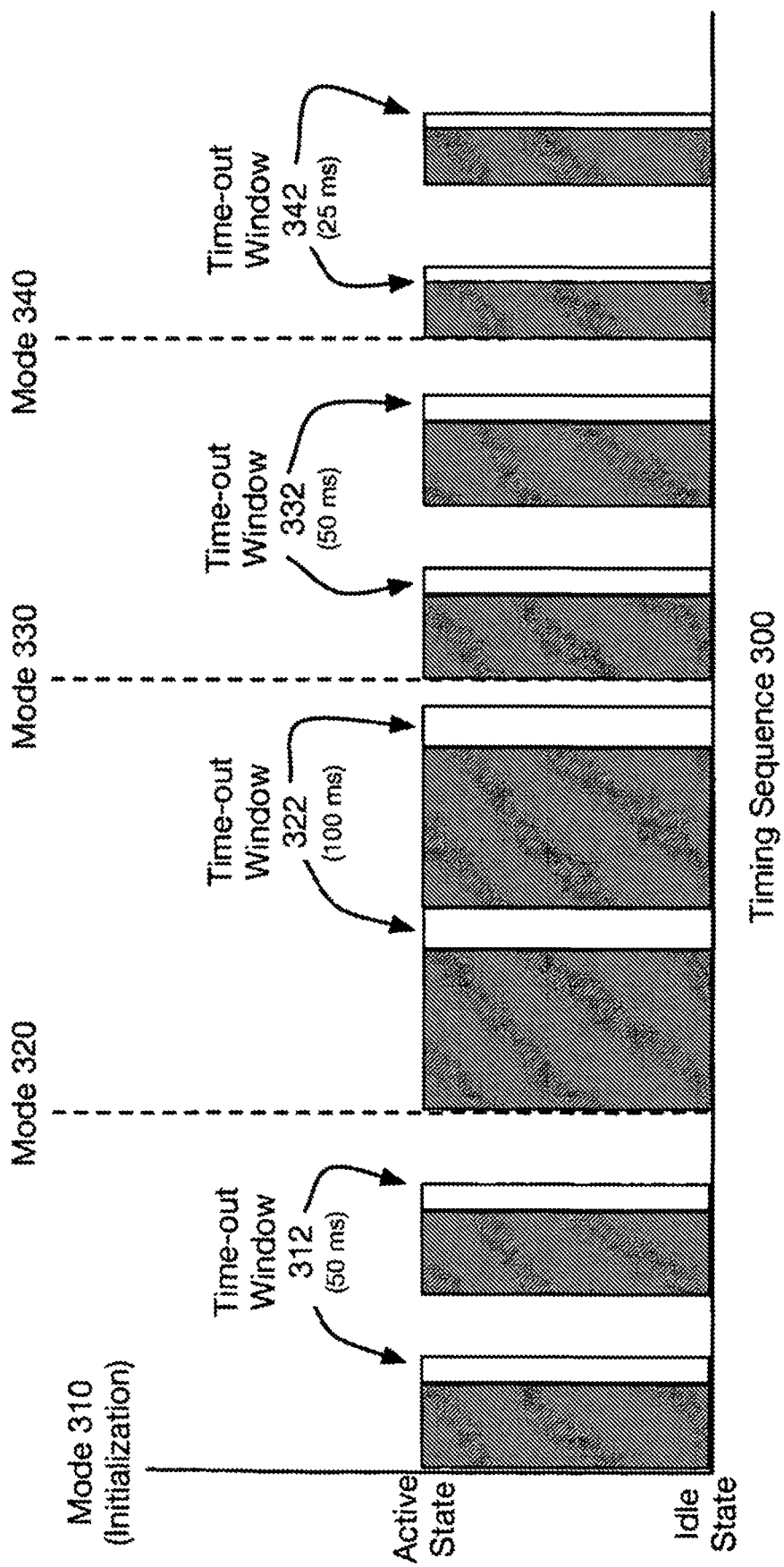
FIG. 3 illustrates an example timing sequence.

FIG. 3 illustrates an example timing sequence 300. In some examples, graphics subsystem QoS manager 114 as shown in FIG. 1 or described in FIG. 2 may include logic and/or features to cause adjustments to time-out windows 312, 322, 332 and 342 during timing sequence 300. For these examples, modes 310, 320, 330 and 340 may represent changes in modes of operation for computing platform 100 and/or the graphic subsystems of computing platform 100 during timing sequence 300. These changes in modes of operations may be responsive to a change in a type of usage of the one or more graphics subsystem, an application request (e.g., from application 130-1), a user request, an expiration of a time interval or an initialization of computing platform 100. It may be appreciated that embodiments are not limited to only these five examples of what may trigger a change in a mode of operation, any number of triggers may trigger a change of mode for a given implementation.

According to some examples, as shown in FIG. 3, mode 310 may be in response to an initialization. For these examples, computing platform 100 may have been powered down and the powered down state may represent a first mode of operation for computing platform 100. Mode 310, for these examples, may therefore represent a second mode of operation. Also, modes 320, 330 and 340 may represent subsequent modes of operation.

In some examples, graphics subsystem QoS manager 114 may include logic and/or features to receive or obtain current power management and performance QoS values associated with the first mode of operation, which as mentioned above, was a powered down state for computing platform 100. For these examples, the current power management and performance QoS values associated with the first mode may be based on default power management and performance QoS values. Also, for the second mode, graphics subsystem QoS manager 114 may include logic and/or features to receive or obtain target power management and performance QoS values that may be based a type of usage of the one or more graphics subsystems of computing platform 100. These types of usage may include, but are not limited to, support for web browsing, video playback, interactive gaming or image capture.

According to some examples, graphics subsystem QoS manager 114 may include logic and/or features to determine current and target QMs based on the current and target QoS values obtained in response to mode 320. Graphics subsystem QoS manager 114 may then adjust one or more power management and performance attributes for one or more graphics subsystems of computing platform 100 based on a comparison of the current and target QMs. These one or more power management and performance attributes may include an idle time-out interval for which the one or more graphics subsystems remain in an active state following execution of a command (e.g., to support a type of usage) before transitioning into a low power state.

In some examples, the one or more power management and performance attributes associated with the current/default power management and performance QoS values may indicate an idle time-out window of 50 milliseconds (ms). The type of usage at mode 320, for example, may be web browsing. An idle time-out window of 50 ms may be an acceptable power management and performance attribute for this type of usage because a relatively long period of time may pass between active and idle states. Graphics subsystem QoS manager 114 may maintain the idle time-out window at 50 ms as shown for time-out window 312 in FIG. 3.

According to some examples, at mode 320 the type of usage may change to graphics intensive use such as an interactive game. Graphics subsystem QoS manager 114 may obtain a new set of current and target power management and performance QoS values. The newly obtained target power management and performance QoS values may indicate an idle time-out window of 100 ms. The longer idle time-out may be due to a graphics intensive use of the interactive game that may cause the graphics subsystems of computing platform to execute bursts of commands with relatively short idle times between the bursts. For these examples, graphics subsystem QoS manager 114 may adjust the idle time-out window as shown for time-out window 322 in FIG. 3. The longer idle time-out window 322 may keep the graphic subsystems in an active state between bursts of commands rather than powering up and down between bursts.

In some examples, at mode 330 the type of usage may change back to web browsing. Graphics subsystem QoS manager 114 may obtain another new set of current and target power management and performance QoS values. As mentioned above, an idle time-out window of 50 ms may be an acceptable power and performance attribute for this type of usage. Graphics subsystem QoS manager 114 may adjust the idle time-out window back to 50 ms as shown for time-out window 332 in FIG. 3.

According to some examples, at mode 340 the type of usage may change yet again to another type of usage such as image capture. Graphics subsystem QoS manager 114 may obtain yet another new set of current and target power management and performance QoS values. The newly obtained target power management and performance QoS values may indicate an idle time-out window of 25 ms. The shorter idle time-out may be due to a less graphics intensive use associated with an image capture usage. The image capture usage may cause the graphics subsystems of computing platform to execute short bursts of commands followed by relatively long periods between the next burst of commands. Thus, for example, a relatively short idle time of around 25 ms may be an acceptable power management and performance attribute for this type of usage.

In some examples, time-out windows 312, 322, 332 and 342 may also be shortened or lengthened due to power management constraints or based on a collected or compiled history of graphics subsystem activity of computing platform 100. For example, a low battery for computing platform 100 during extended periods of sustained activity may lead to a shorter idle time-out window in order to conserve power. Also, a history of usage may indicate that an idle time-out window of relatively long duration at initialization of computing platform 100 (e.g., at mode 310) may be warranted. The longer idle time-out window at initialization may be due to a user or applications historically requiring more or greater use of graphics subsystems during initialization or powering up of computing platform 100.

FIG. 4 illustrates an example table 400 for current power management QoS values. In some examples, graphics subsystem QoS manager 114 may include logic and/or features to receive current power management QoS values (e.g., from device driver(s) 112). Graphics subsystem QoS manager 114 may then populate or build table 400 (e.g., via current feature 215) based on the received current power management QoS values.

As shown in FIG. 4, table 400 includes separate and averaged power vs. performance ratings for various power management attributes including the general power management attributes of display, graphics & video, and system power. Current power management QoS values of "3" may be an indication that power management is more highly rated than performance. Current power management QoS values of values of "2" may indicate equal rating. Current power management QoS values of values of "1" may indicate that power management is rated less compared to performance.

In some examples, current power management QoS values may be the result of various settings or operating parameters for the graphics subsystems of computing platform 100. The various setting, for example, may be associated with a type of usage for these graphics subsystems. The type of usage may include, but is not limited to, a default usage (e.g., established at initialization at possibly set by a device manufacturer), a web browsing usage, a video playback usage, interactive game usage or an image capture usage. The various settings may also be associated with system power capabilities such as an amount of battery power available to meet power management needs or objectives.

According to some examples, as shown in FIG. 4, the display power management attribute may include resolution, brightness, refresh rate, and depth. The display power management attributes, for example, may be associated with power management attributes for the graphics subsystem of display controller 120-1. Resolution, brightness, refresh rate and depth, for example, may also be associated with attributes for a display controlled by display controller 120-1. Resolution, for example, may include pixel resolution. Brightness may include display brightness. Refresh rate may include display refresh rates and depth may include pixel depths or pixel memory sizes (e.g., 24-bit, 32-bit, etc.).

In some examples, as shown in FIG. 4, the graphics & video power management attribute may include texture, render target, overlay type, frequency, copy rate, mipmap, and compression ratio. The graphics & video power management attribute may be associated with power management attributes for the graphics subsystems of camera 120-2, 2D/3D graphics 120-3, video encode 120-4 or video decode 120-5. Texture, for example, may include compressed texture formats. Render target may include soft rendering or full rendering. Overlay type may include either overlay or texture based video. Frequency may include the frequency for one or more graphics subsystems (e.g., 2D/3D graphics 120-3) to execute commands. Copy rate may include a copy rate (e.g., blits) from a source buffer to a destination buffer. Mipmap may include an indication of 3D image rendering and compression ratio may include the compression ratio via which video may be encoded or decoded by one or more graphics subsystems (e.g., video encode 120-4 and/or video decode 120-5).

In some examples, as shown in FIG. 4, the system power attribute may include system state and battery power. The system power attributes may be associated with power management attributes that may impact all or portions of the graphics subsystems of computing platform 100. System state may include the current power state of computing platform 100 (e.g., active, idle, sleep, etc.). Battery power may include the system battery power available to power the graphics subsystems.

In some examples, the current power management QoS values shown in table 400 of FIG. 4 may be associated with the current mode of operation for computing platform 100. Graphics subsystem QoS manager 114 may include logic and/or features to determine a current power management average ($PM_{ave}$) based on average current power management QoS values for display, graphics and video, and system power. For example, current $PM_{ave}$ derived from the values shown in table 400 may be (2.5, 2, 1.5). The current $PM_{ave}$ (2.5, 2, 1.5) may indicate a relatively high rating for display attributes (2.5), a medium rating for graphics and video (2) and a relatively low rating on system attributes (1.5).

FIG. 5 illustrates an example table 500 for current performance QoS values. In some examples, graphics subsystem QoS manager 114 may include logic and/or features to receive current performance management QoS values (e.g., from platform power management 140). Graphics subsystem QoS manager 114 may then populate or build table 500

(e.g., via current feature 215) based on the received current performance management QoS values.

As shown in FIG. 5, table 500 includes separate and averaged performance vs. power ratings for various performance attributes including the general performance attributes of display, graphics & video, application, user experience and system performance. Current performance management QoS values of "3" may be an indication that performance is more highly rated than power management. Current performance management QoS values of "2" may indicate equal rating. Current performance management QoS values of "1" may indicate that performance management is rated less compared to power management.

In some examples, similar to current power management QoS values, current performance management QoS values may be the result of various settings or operating parameters for the graphics subsystems of computing platform 100. The various setting, for example, may also be associated with a type of usage for these graphics subsystems. The various settings may also be associated with system performance capabilities or constraints such as available processing power at CPU 170 or available processing power at one or more of the graphics subsystems.

According to some examples, as shown in FIG. 5, the display performance attribute may include resolution, brightness, refresh rate, and depth. The display performance attributes may be associated with power management attributes for the graphics subsystem of display controller 120-1. Resolution, brightness, refresh rate and depth, for example, may be associated with attributes for a display controlled by display controller 120-1. Resolution, for example, may include pixel resolution. Brightness may include display brightness. Refresh rate may include display refresh rates and depth may include pixel depths or pixel memory sizes.

In some examples, as shown in FIG. 5, the graphics & video performance attribute may include texture, render target, overlay type, frequency, copy rate, mipmap, and compression ratio. The graphics & video performance attribute may be associated with performance attributes for the graphics subsystems of camera 120-2, 2D/3D graphics 120-3, video encode 120-4 or video decode 120-5. Texture, for example, may include compressed texture formats. Render target may include soft rendering or full rendering. Overlay type may include either overlay or texture based video. Frequency may include the frequency for one or more graphics subsystems to execute commands. Copy rate may include a copy rate (e.g., blits) from a source buffer to a destination buffer. Mipmap may include an indication of 3D image rendering and compression ratio may include the compression ratio via which video may be encoded or decoded by one or more graphics subsystems of computing platform 100.

In some examples, as shown in FIG. 5, the application performance attribute may include maximum latency. Maximum latency, for example, may include a maximum time interval via which an application can tolerate when using one or more graphics subsystems of computing platform 100. For example, an application associated with video playback may set a maximum latency for decoding video using video decode 120-5. The maximum latency, for example, may ensure that video frames are decoded at a rate to ensure that corresponding audio frames match the video frames. A time interval of a relatively short time period may result in a high rating for performance and a relatively long time period may result in a low rating.

According to some examples, as shown in FIG. 5, the user experience attribute may include maximum response. Maximum response, for example, may include a maximum time interval via which a user can tolerate when using one or more graphics subsystems of computing platform 100. For example, a user playing an interactive game may set a maximum response for the rendering of 2D/3D graphics by 2D/3D graphics 120-3 in order to increase the user experience of the interactive game. A time interval of a relatively short time period may result in a high rating for performance vs. power management and a relatively long time period may result in a low rating for performance vs. power management.

In some examples, as shown in FIG. 5, the system performance attribute may include system state. The system performance attributes may be associated with performance attributes that may impact all or portions of the graphics subsystems of computing platform 100. System state, for example, may include the current power state of computing platform 100 (e.g., active, idle, sleep, etc.).

In some examples, the current performance QoS values shown in table 500 of FIG. 5 may be associated with the current mode of operation for computing platform 100. Graphics subsystem QoS manager 114 may include logic and/or features to determine a current performance average ($PF_{ave}$) based on average current performance QoS values for display, graphics and video, application, user experience, and system performance. For example, the current $PF_{ave}$ derived from the values shown in table 500 may be (2, 3, 2, 3, 3). The current $PF_{ave}$ (2, 3, 2, 3, 3) may indicate high ratings for the graphics and video, user experience, and system performance attributes and a medium rating for the display and application attributes.

According to some examples, graphics subsystem QoS manager 114 may include logic and/or features to determine a current QM. The current QM may be a combination of current $PM_{ave}$ (2.5, 2, 1.5) and current $PF_{ave}$ (2, 3, 2, 3, 3). One example of combining current $PM_{ave}$ (2.5, 2, 1.5) and current $PF_{ave}$ (2, 3, 2, 3, 3) may include taking the values of 2.5, 2, and 1.5 included in current $PM_{ave}$ (2.5, 2, 1.5) and averaging these values to arrive at an overall current $PM_{ave}$ (2). Also, the averages of 2, 3, 2, 3 and 3 included in current $PF_{ave}$ may be averaged to arrive at overall current $PF_{ave}$ (2.6). Overall current $PM_{ave}$ (2) and overall current $PF_{ave}$ (2.6) may then be combined to arrive at current QM (2, 2.6). As mentioned below, the current QM (2, 2.6) may be compared to a target QM and then graphics subsystem QoS manager 114 may make adjustments to one or more power management or performance attributes based on the comparison.

FIG. 6 illustrates an example table 600 for target power management QoS values. In some examples, graphics subsystem QoS manager 114 may include logic and/or features to receive target power management QoS values (e.g., from device driver(s) 112, applications 130-1 to 130-n or users). Graphics subsystem QoS manager 114 may then populate or build table 600 (e.g., via target feature 217) based on the received target power management QoS values.

According to some examples, as shown in FIG. 6, table 600 is similar to table 400 depicted in FIG. 4. As such, table 600 includes the same power management attributes as table 400. However, the ratings for the various power management attributes are target ratings rather than current ratings.

In some examples, target power management QoS values may be the result of various targeted settings or operating parameters for the graphics subsystems of computing platform 100. The various targeted setting, for example, may be associated with a proposed type of usage for these graphics subsystems. The proposed type of usage may include, but is not limited to, a web browsing usage, a video playback usage, interactive game usage or an image capture usage. The various setting may also be associated with system power capabilities such as an amount of battery power available to meet power management needs or objectives for platform 100's anticipated operating power state(s).

According to some examples, the target power management QoS values shown in table 600 of FIG. 6 may be associated with a target mode of operation for computing platform 100. Graphics subsystem QoS manager 114 may include logic and/or features to determine a target $PM_{ave}$ based on average target power management QoS values for display, graphics and video, and system power. For example, the target $PM_{ave}$ derived from values shown in table 6 may be (1, 1, 1). The target $PM_{ave}$ (1, 1, 1) may indicate a low rating on all target power management attributes.

FIG. 7 illustrates an example table 700 for target performance QoS values. In some examples, graphics subsystem QoS manager 114 may include logic and/or features to receive target performance management QoS values (e.g., from device driver(s) 112, applications 130-1 to 130-*n* or users). Graphics subsystem QoS manager 114 may then populate or build table 700 (e.g., via target feature 217) based on the received target performance management QoS values.

According to some examples, as shown in FIG. 7, table 700 is similar to table 500 depicted in FIG. 5. As such, table 700 includes the same performance attributes as table 500. However, the ratings for the various performance attributes are target ratings rather than current ratings.

In some examples, target performance QoS values may be the result of various targeted settings or operating parameters for the graphics subsystems of computing platform 100. The various targeted setting, for example, may be associated with a proposed type of usage for these graphics subsystems. The proposed type of usage may include, but is not limited to, a web browsing usage, a video playback usage, interactive game usage or an image capture usage. The various setting may also be associated with application requirements (e.g., maximum latency), user experience requirements (maximum response) or system performance capabilities such as available processing power or proposed operating states.

According to some examples, the target performance QoS values shown in table 700 of FIG. 7 may be associated with a target mode of operation for computing platform 100. Graphics subsystem QoS manager 114 may include logic and/or features to determine a target $PF_{ave}$ based on average target performance QoS values for display, graphics and video, application, user experience and system performance. For example, the target $PF_{ave}$ derived from the values shown in table 700 may be (3, 3, 3, 3, 3). The target $PF_{ave}$ (3, 3, 3, 3, 3) may indicate a high rating on all target performance attributes.

In some examples, graphics subsystem QoS manager 114 may include logic and/or features to determine a target QM. The target QM may be a combination of target $PM_{ave}$ (1, 1, 1) and target $PF_{ave}$ (3, 3, 3, 3, 3). One example of combining target $PM_{ave}$ (1, 1, 1) and target $PF_{ave}$ (3, 3, 3, 3, 3) may include taking the values of 1, 1 and 1 included in target $PM_{ave}$ (1, 1, 1) and averaging these values to arrive at an overall target $PM_{ave}$ (1). Also, the averages of 3, 3, 3, 3 and 3 included in target $PF_{ave}$ may be averaged to arrive at overall target $PF_{ave}$ (3). Overall target $PM_{ave}$ (1) and overall target $PF_{ave}$ (3) may then be combined to arrive at target QM (1, 3).

According to some examples, graphics subsystem QoS manager 114 may include logic and/or features to compare target QM (1, 3) to current QM (2, 2.6) and may make adjustments to one or more power management or performance attributes based on the comparison (e.g., via adjust feature 219). For example, graphics subsystem QoS manager 114 may attempt to adjust the one or more power management or performance attributes shown in tables 400 and 500 such that the averages of the average ratings for the power management and performance attributes will change current QM (2, 2.6) to match target QM (1, 3). As a result, the current QM (2, 2.6) becomes adjusted current QM (1, 3). The adjusted current QM (1, 3) now indicates that computing platform places a low overall rating on power management and a high overall rating on performance. Also, adjusted current power management and performance QoS values will reflect this change in rating.

Figure 8:
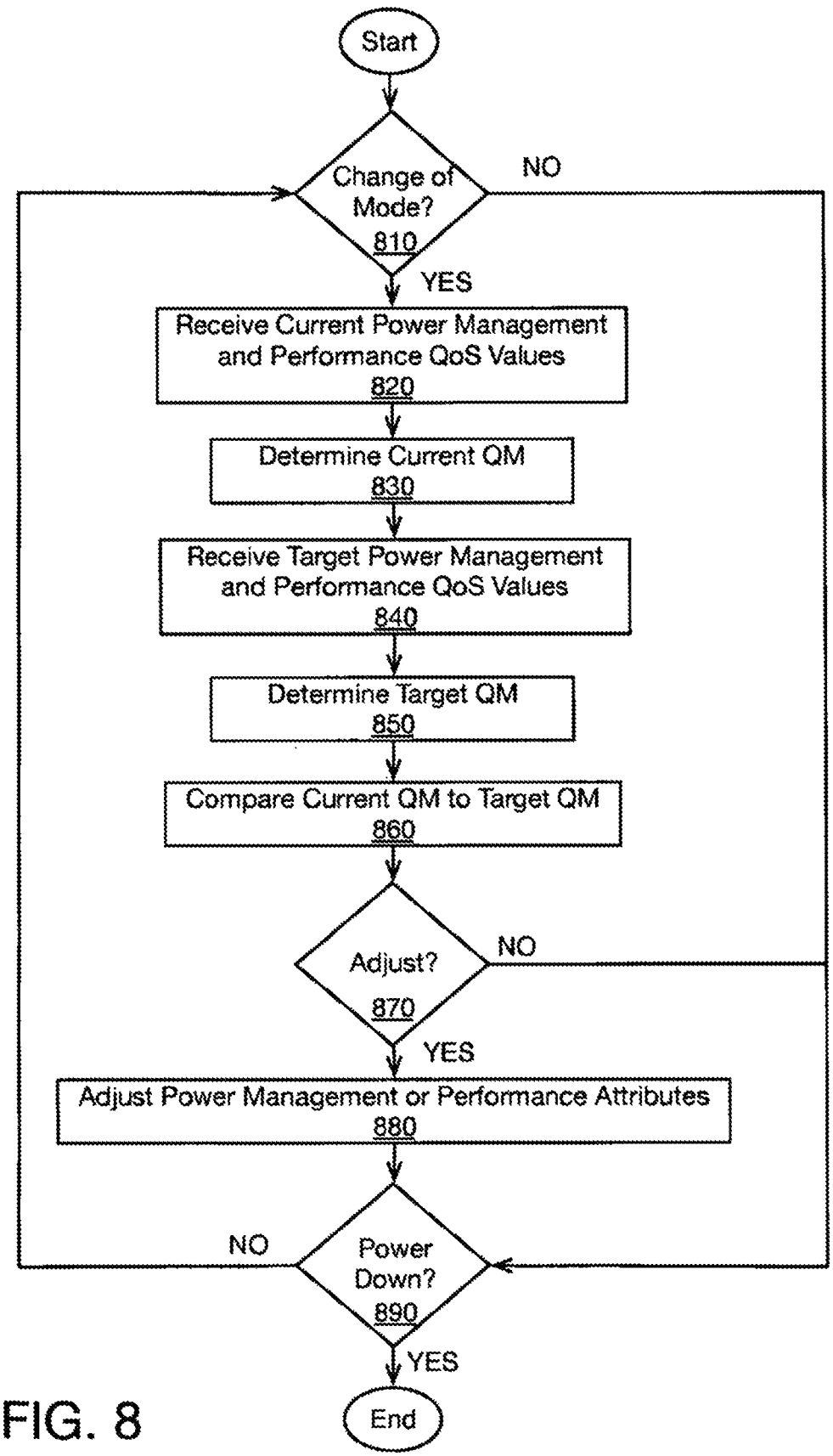
FIG. 8 illustrates a flow chart of example operations for adaptive graphics subsystem power and performance management.

FIG. 8 illustrates a flow chart of example operations for adaptive graphics subsystem power and performance management. In some examples, elements of computing platform 100 as shown in FIG. 1 may be used to illustrate example operations related to the flow chart depicted in FIG. 8. Graphics subsystem QoS manager 114 as shown in FIG. 1 and FIG. 2 may also be used to illustrate the example operations. But the described methods are not limited to implementations on computing platform 100 or to graphics subsystem QoS manager 114. Also, logic and/or features of graphics subsystem QoS manager 114 may build or populate tables including various power management and/or performance QoS values as shown in FIGS. 4-7. However, the example operations may also be implemented using other types of tables to indicate current and target QoS values.

Moving from the start to decision block 810 (Change of Mode?), graphics subsystem QoS manager 114 may include logic and/or features configured to determine whether a change in mode has occurred (e.g., via mode feature 211). In some examples, a change in mode may be responsive to a change in a type of usage of at least portions of computing platform 100, an application request, a user request, an expiration of a time interval or an initialization of computing platform 100. If a change of mode has occurred, the process moves to block 820. Otherwise, the process moves to block 890.

Moving from decision block 810 to block 820 (Receive Current Power Management and Performance QoS Values), graphics subsystem QoS manager 114 may include logic and/or features configured to receive current power management and performance QoS values (e.g., via receive feature 213). In some examples, the current power management and performance QoS values may be associated with a current type of usage for computing platform 100 (e.g., web browsing). For these examples, graphics subsystem QoS manager 114 may also include logic and/or features to build or populate tables (e.g., via current feature 215) based on the received current power management and performance QoS values. The tables may be similar in format to the tables 400 and 500 shown in FIGS. 4 and 5 and described above.

Proceeding from block 820 to block 830 (Determine Current QM), graphics subsystem QoS manager 114 may include logic and/or features configured to determine a current QM (e.g., via current feature 215). In some examples, the current QM may be determined based on the current power management and performance QoS values. As described above for FIGS. 4 and 5, in some examples, the current QM may be a combination of the averaged power management and performance QoS values.

Proceeding from block 830 to block 840 (Receive Target Power Management and Performance QoS Values), graphics subsystem QoS manager 114 may include logic and/or features configured to receive target power management and performance QoS values (e.g., via receive feature 213). In some examples, the target power management and performance QoS values may be associated with a different or new type of usage for computing platform 100 (e.g., interactive gaming). For these examples, graphics subsystem QoS manager 114 may also include logic and/or features to build or populate tables (e.g., via target feature 215) based on the received target power management and performance QoS values. The tables may be similar in format to tables 600 and 700 shown in FIGS. 6 and 7 and described above.

Proceeding from block 840 to block 850 (Determine Target QM), graphics subsystem QoS manager 114 may include logic and/or features configured to determine a target QM (e.g., via target feature 215). In some examples, the target QM may be determined based on the target power management and performance QoS values. As described above for FIGS. 6 and 7, in some examples, the target QM may be a combination of the averaged power management and performance QoS values.

Proceeding from block 850 to block 860 (Compare Current QM to Target QM), graphics subsystem QoS manager 114 may include logic and/or features configured to compare the current QM to the target QM (e.g., via adjust feature 219).

Proceeding from block 860 to decision block 870 (Adjust?), graphics subsystem QoS manager 114 may include logic and/or features configured determine whether one or more power management or performance attributes for the one or more graphics subsystems of computing platform 100 needs to be adjusted (e.g., via adjust feature 219). In some examples, adjustments may be based on whether the current QM and the target QM match. If the current QM and the target QM do not at least approximately match, the process moves to block 880. Otherwise, the process moves to decision block 890.

Moving from decision block 870 to block 880 (Adjust Power Management or Performance Attributes), graphics subsystem QoS manager 114 may include logic and/or features configured to adjust one or more power management or performance attributes (e.g., via adjust feature 219) based on the current QM and the target QM not matching. In some examples, the current power management or performance attributes may be changed such that the averages of the average ratings for the power management and performance attributes will change the current QM to at least approximately match the target QM.

In some other examples, an idle time-out window for one or more of the graphics subsystems of computing platform 100 may be another power management or performance attribute that is adjusted. For these examples, computing platform 100 may have limitations or constraints that make it difficult to adjust the power management or performance attributes mentioned above for tables 400 and 500 to cause the current QM to at least approximately match the target QM. The idle time-out window may be adjusted to a shorter time period to boost a power management QoS value and lower a performance QoS value. Alternatively, the idle time-out window may be lengthened to lower the power management QoS value and boost the performance power management QoS value.

Moving from block 880 to decision block 890 (Power Down?), graphics subsystem QoS manager 114 may include logic and/or features configured to determine whether computing platform 100 is powering down (e.g., via current feature 215). If computing platform 100 is powering down the process comes to an end. Otherwise, the process moves back to decision block 810.

Figure 9:
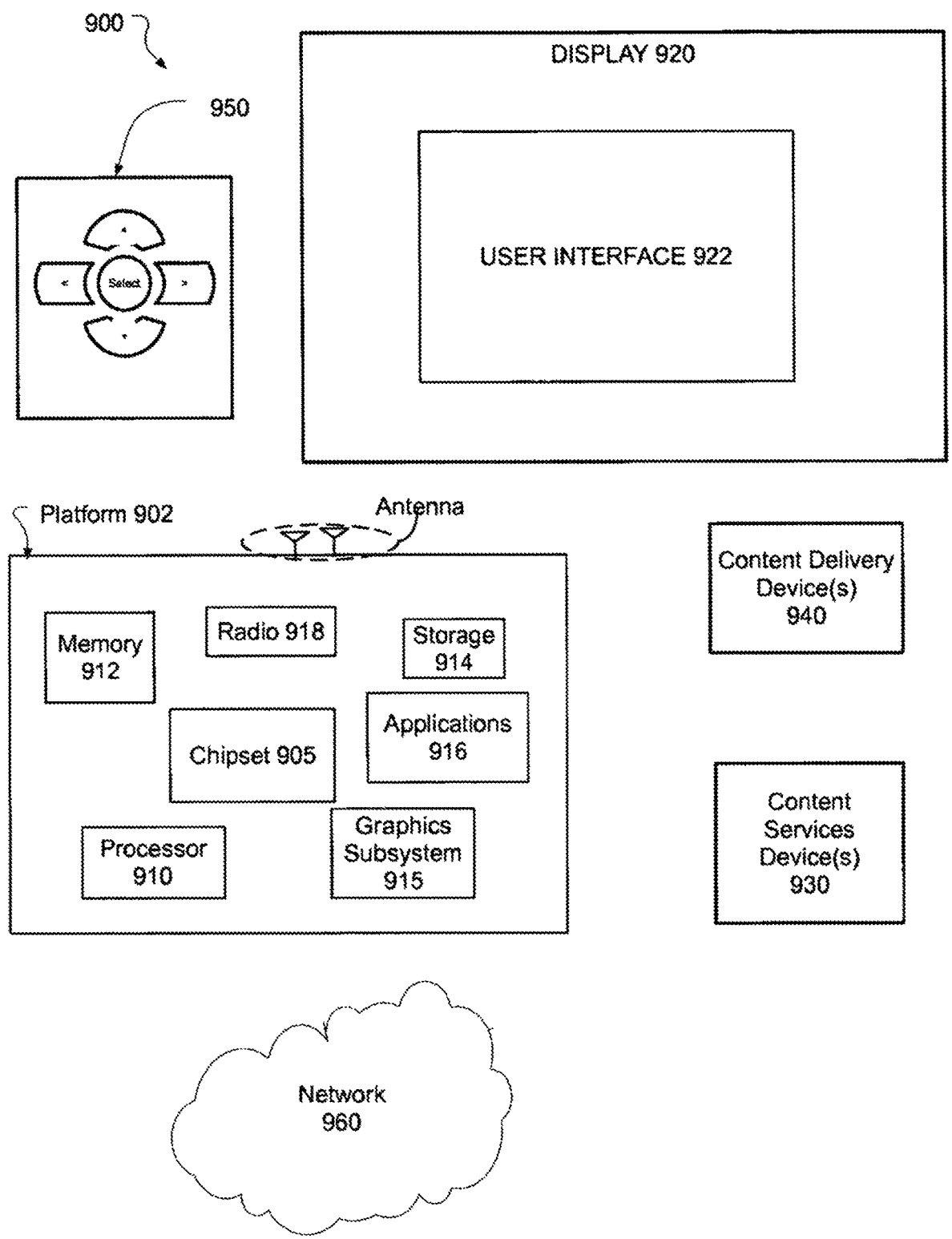
FIG. 9 illustrates an example system.

FIG. 9 illustrates an example system 900. In some examples, system 900 may be a media system although system 900 is not limited to this context. For example, system 900 may be incorporated into a personal computer (PC), laptop computer, ultra-mobile computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

According to some examples, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in more detail below.

In some examples, platform 902 may include any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as Complex Instruction Set Computer (CISC) or Reduced Instruction Set Computer (RISC) processors, x86 instruction set compatible processors, multi-core, or any other microprocessor or central processing unit (CPU). In some examples, processor 910 may comprise dual-core processor(s), dual-core mobile processor(s), and so forth.

Memory 912 may be implemented as a volatile memory device such as, but not limited to, a RAM, DRAM, or SRAM.

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some examples, storage 914 may include technology to increase the storage performance enhanced protection for valuable digital media when multiple hard drives are included, for example.

Graphics subsystem 915 may perform processing of images such as still or video for display. Similar to the graphics subsystems described above for FIG. 1, graphics subsystem 915 may include a processor serving as a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. For some examples, graphics subsystem 915 could be integrated into processor 910 or chipset 905. Graphics subsystem 915 could also be a stand-alone card (e.g., a discrete graphics subsystem) communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another example, the graphics and/or video functions may be implemented by a general purpose processor, including a multi-core processor. In a further example, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In some examples, display 920 may comprise any television type monitor or display. Display 920 may include, for example, a computer display screen, touch screen display, video monitor, television-like device, and/or a television. Display 920 may be digital and/or analog. For some examples, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

According to some examples, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In some examples, content services device(s) 930 may comprise a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 receives content such as cable television programming including media information, digital information, and/or other content. Examples of content providers may include any cable or satellite television or radio or Internet content providers. The provided examples are not meant to limit the scope of this disclosure.

In some examples, platform 902 may receive control signals from navigation controller 950 having one or more navigation features. The navigation features of controller 950 may be used to interact with user interface 922, for example. According to some examples, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be echoed on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In some examples, controller 950 may not be a separate component but integrated into platform 902 and/or display 920. Although this disclosure is not limited to the elements or in the context shown for controller 950.

According to some examples, drivers (not shown) may comprise technology to enable users to instantly turn on and off platform 902 like a television with the touch of a button after initial boot-up, when enabled. Program logic may allow platform 902 to stream content to media adaptors or other content services device(s) 930 or content delivery device(s) 940 when the platform is turned "off." In addition, chip set 905 may include hardware and/or software support for 5.1 surround sound audio and/or high definition 7.1 surround sound audio, for example. Drivers may include a graphics driver for integrated graphics platforms. For some examples, the graphics driver may comprise a peripheral component interconnect (PCI) Express graphics card.

In various examples, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various examples, platform 902 and display 920 may be an integrated unit. Display 920 and content service device(s) 930 may be integrated, or display 920 and content delivery device(s) 940 may be integrated, for example. These examples are not meant to limit this disclosure.

In various examples, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (MC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The examples mentioned above, however, are not limited to the elements or in the context shown or described in FIG. 9.

Figure 10:
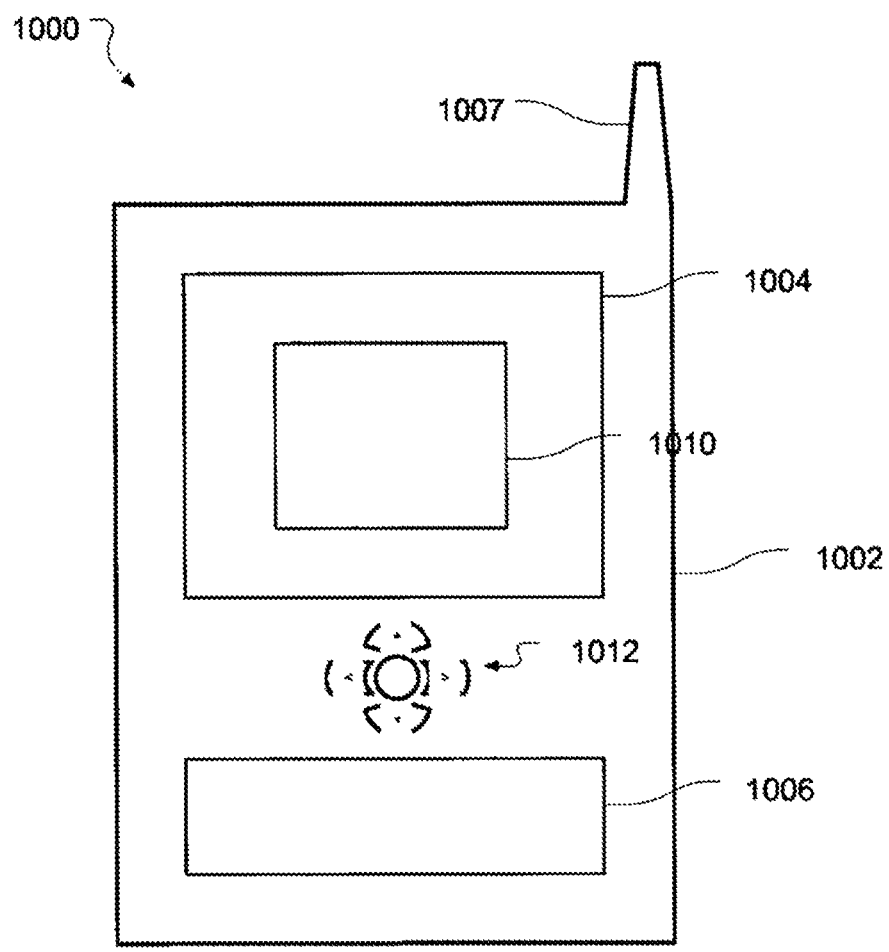
FIG. 10 illustrates an example device.

FIG. 10 illustrates an example device 1000. As described above, system 900 may be embodied in varying physical styles or form factors. FIG. 10 illustrates examples of a small form factor device 1000 in which system 900 may be embodied. In some examples, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-mobile computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. According to some examples, a mobile computing device may be implemented as a smart phone capable of executing computer applications, as well as voice communications and/or data communications. Although some examples may be described with a mobile computing device implemented as a smart phone by way of example, it may be appreciated that other examples may be implemented using other wireless mobile computing devices as well. The examples are not limited in this context.

As shown in FIG. 10, device 1000 may include a housing 1002, a display 1004, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone. For some examples, a voice recognition device may digitize such information. Although the disclosure is not limited in this context.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture. An article of manufacture may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

According to some examples, an article of manufacture may include a non-transitory storage medium to store or maintain instructions that when executed by a computer or system, cause the computer or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a computer to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   operating a computing platform including a processor circuit to perform a first type of usage, wherein a current quality is provided by the performance of the first type of usage, the current quality being based on a current power management quality of service (QoS) value and a current performance QoS value;
   transitioning the computing platform from the first type of usage to a second type of usage, a target quality is associated with the second type of usage, the target quality being based on a target power management QoS value and a target performance QoS value;
   comparing the current quality with the target quality; and
   adjusting one or more power management or performance attributes for one or more graphics subsystems of the computing platform based on the comparing of the current quality with the target quality;
   wherein adjusting of the one or more power management or performance attributes is intended to provide a current quality in the performance of the second type of usage that meets the target quality.

2. The method of claim 1, wherein adjusting the one or more power management or performance attributes includes adjusting an idle time-out window, the idle time-out window to include a time interval for which the one or more graphics subsystems remain in an active state following execution of a command before transitioning into a low power state.

3. The method of claim 1, further comprising receiving the target power management and target performance QoS values and the current power management and current performance QoS values in response to transitioning from the first type of usage to the second type of usage.

4. The method of claim 1, wherein the first and second types of usage each include one of web browsing, video playback, interactive game, image capture, or default.

5. The method of claim 1, wherein the target and current power management QoS values including at least one of a display attribute, a graphics and video attribute, or a system attribute.

6. The method of claim 5, wherein:
   the display attribute including at least one of a resolution, a brightness, a refresh rate or a pixel size depth,
   the graphics and video attribute including at least one of a compressed texture format, a render target, a type of overlay for rendering, a frequency for one or more graphics subsystems to execute, a copy rate from source buffer to a destination buffer, a mipmap or a video compression ratio and
   the system attribute including at least one of a system state for the computing platform and a battery life for the computing platform.

7. The method of claim 1, wherein the target and current performance QoS values including at least one of a display attribute, a graphics attribute, a video attribute, an application attribute, or a user experience attribute.

8. The method of claim 7, wherein:
   the display attribute including at least one of a resolution, a brightness, a refresh rate or a pixel size depth;
   the graphics attribute including at least one of a compressed texture format, a render target, a type of overlay for rendering, a frequency for one or more graphics subsystems to execute, a copy rate from source buffer to a destination buffer or a mipmap;
   the video attribute includes a compression ratio, the application attribute including a maximum latency tolerance; and
   the user experience attribute including a maximum response time.

9. An apparatus comprising:
   a computing platform including a processor circuit, the processor circuit including one or more processors; and a memory unit communicatively coupled to the processor circuit;

wherein the processor circuit is to:

operate the computing platform to perform a first type of usage, wherein a current quality is provided by the performance of the first type of usage, the current quality being based on a current power management quality of service (QoS) value and a current performance QoS value;

transition the computing platform from the first type of usage to a second type of usage, a target quality is associated with the second type of usage, the target quality being based on a target power management QoS value and a target performance QoS value;

compare the current quality with the target quality; and adjust one or more power management or performance attributes for one or more graphics subsystems of the computing platform based on the comparing of the current quality with the target quality;

wherein the adjusting the one or more power management or performance attributes is intended to provide a current quality in the performance of the second type of usage that meets the target quality.

10. The apparatus of claim 9, wherein adjusting the one or more power management or performance attributes includes adjusting an idle time-out window, the idle time-out window to include a time interval for which the one or more graphics subsystems remain in an active state following execution of a command before transitioning into a low power state.

11. The apparatus of claim 9, wherein the processor circuit is further to receive the target power management and target performance QoS values and the current power management and current performance QoS values in response to changing from the first type of usage to the second type of usage.

12. The apparatus of claim 9, wherein the first and second types of usage each include one of web browsing, video playback, interactive game, image capture, or default.

13. The apparatus of claim 9, wherein the target and current power management QoS values including at least one of a display attribute, a graphics and video attribute, or a system attribute.

14. The apparatus of claim 13, wherein:

the display attribute including at least one of a resolution, a brightness, a refresh rate or a pixel size depth, the graphics and video attribute including at least one of a compressed texture format, a render target, a type of overlay for rendering, a frequency for one or more graphics subsystems to execute, a copy rate from source buffer to a destination buffer, a mipmap or a video compression ratio and the system attribute including at least one of a system state for the computing platform and a battery life for the computing platform.

15. The apparatus of claim 9, wherein the target and current performance QoS values including at least one of a display attribute, a graphics attribute, a video attribute, an application attribute, or a user experience attribute.

16. The apparatus of claim 15, wherein:

the display attribute including at least one of a resolution, a brightness, a refresh rate or a pixel size depth;

the graphics attribute including at least one of a compressed texture format, a render target, a type of overlay for rendering, a frequency for one or more graphics subsystems to execute, a copy rate from source buffer to a destination buffer or a mipmap;

the video attribute includes a compression ratio, the application attribute including a maximum latency tolerance; and the user experience attribute including a maximum response time.

17. An article of manufacture comprising a storage medium containing instructions that when executed cause a system to perform:

operating a computing platform including a processor circuit to perform a first type of usage, wherein a current quality is provided by the performance of the first type of usage, the current quality being based on a current power management quality of service (QoS) value and a current performance QoS value;

transitioning the computing platform from the first type of usage to a second type of usage, a target quality is associated with the second type of usage, the target quality being based on a target power management QoS value and a target performance QoS value;

comparing the current quality with the target quality; and adjusting one or more power management or performance attributes for one or more graphics subsystems of the computing platform based on the comparing of the current quality with the target quality;

wherein adjusting of the one or more power management or performance attributes is intended to provide a current quality in the performance of the second type of usage that meets the target quality.

18. The article of manufacture of claim 17, wherein adjusting the one or more power management or performance attributes includes adjusting an idle time-out window, the idle time-out window to include a time interval for which the one or more graphics subsystems remain in an active state following execution of a command before transitioning into a low power state.

19. The article of manufacture of claim 17, wherein the instructions further comprise instructions to perform receiving the target power management and target performance QoS values and the current power management and current performance QoS values in response to transitioning from the first type of usage to the second type of usage.

20. The article of manufacture of claim 17, wherein the first and second types of usage each include one of web browsing, video playback, interactive game, image capture, or default.

* * * * *